Patented Nov. 17, 1925.

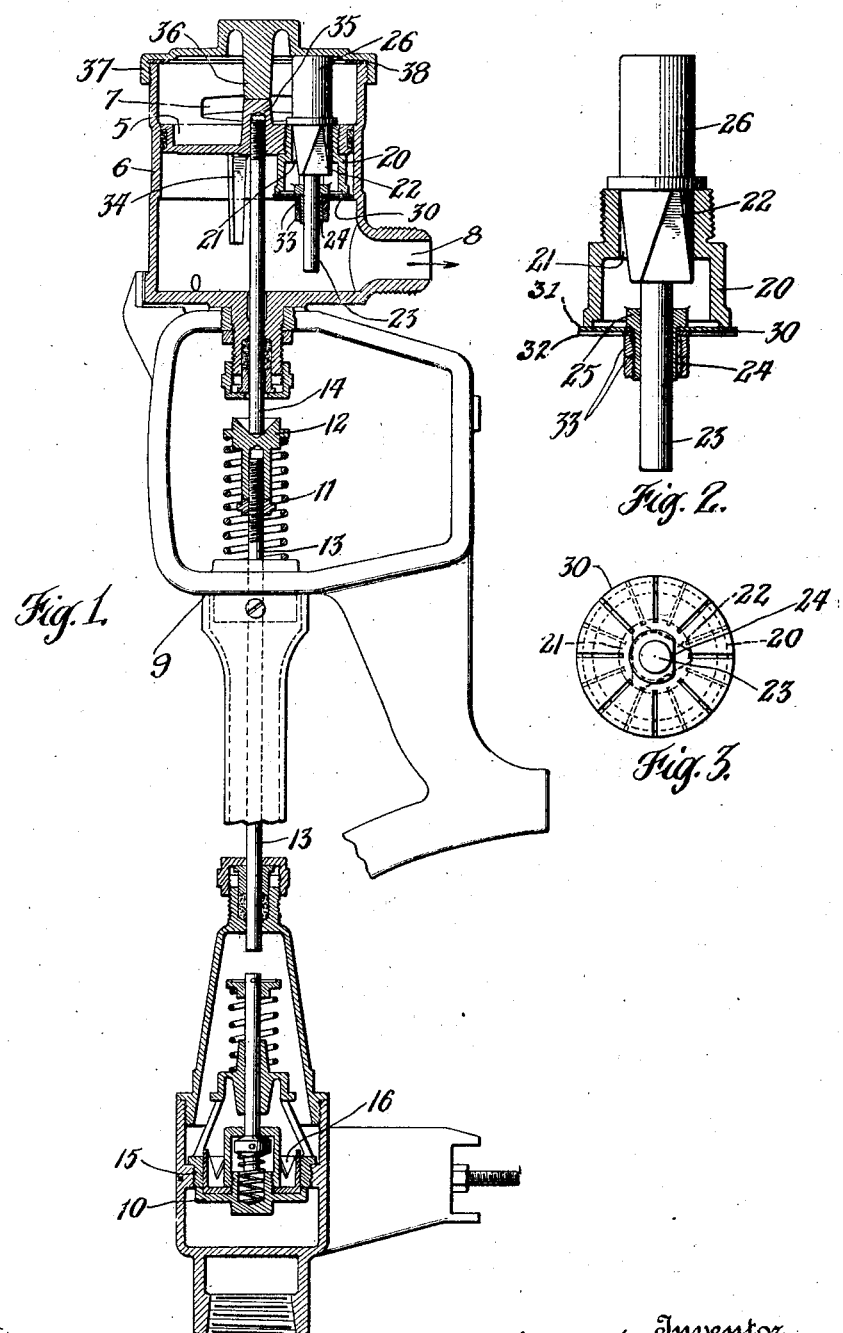

1,561,938

UNITED STATES PATENT OFFICE.

JOHN H. KOLTS, OF CRAFTON, PENNSYLVANIA, ASSIGNOR TO PITTSBURG WATER HEATER COMPANY, A CORPORATION OF NEW JERSEY.

WATER VALVE FOR INSTANTANEOUS WATER HEATERS.

Application filed May 19, 1922. Serial No. 562,058.

*To all whom it may concern:*

Be it known that I, JOHN H. KOLTS, a citizen of the United States, residing at Crafton, in the county of Allegheny and State of Pennsylvania, have invented certain new and useful Improvements in Water Valves for Instantaneous Water Heaters, of which the following is a specification.

My invention relates to water or pressure valves for instantaneous water heaters and the like. I aim to obviate the necessity of employing springs exposed to contact with the water; to facilitate cleaning when required; and to make the closing action of the valve as certain and reliable as possible.

How any and all of these and other advantages can be secured through my invention will appear from my description hereinafter of the best embodiment of the invention known to me.

In the drawings, Fig. 1 is a general side view of apparatus embodying my invention, with the water and gas valves employed in section.

Fig. 2 is an enlarged side view of a regulating valve device, with its seat in section.

Fig. 3 is a bottom plan view of a check valve device that appears in section in Fig. 2.

In instantaneous water heating apparatus such as here referred to, the water valve comprises a piston 5 adapted to move back and forth in a cylindrical water chamber 6, between its water inlet 7 (which is connected to the city mains or other source of water supply) and its water outlet 8 (which is connected to the piping system leading to the hot water heater, and thence to the hot water faucets to be served by the heater). As shown, the chamber 6 is supported by a suitable frame or bracket 9, to which may also be attached the casing of the valve 10 controlling the supply of gas or other fuel to the burner of the heater. When a hot water faucet anywhere in the system is turned on, so as to permit outflow of water through the chamber outlet 8, the pressure of the water supply at the other side of the piston 5 moves the piston toward said outlet 8; when the faucet is turned off, the piston is automatically returned toward the chamber inlet 7,—as by a helical compression spring 11, adjustably secured on the upper end of a longitudinally movable rod 13 that extends into the casing of the gas control valve 10. When a hot water faucet is opened, the resulting movement of the piston 5 and its rod 14 is transmitted through the rod 13 to actuate the self-closing spring pressed disc and piston valve 10, so as to depress it past its seat 15 and open the triangular or "saw tooth" piston notches 16 to permit a corresponding flow of gas to the heater. At the same time, the movement of the piston 5 opens a water passage or aperture (presently to be described) from one side of the piston to the other, so as to permit water from the supply to flow through the chamber 6 past the piston to the water heater, and thence to the open faucet. When the faucet is closed, the resultant return movement of the piston 5 causes closure of the gas valve 10, and also of the water passage or aperture past the piston.

As here shown, the water passage or aperture just above referred to is in the piston 5 itself, through a hollow sleeve or housing 20 whose reduced upper end is screwed fast in a suitably tapped hole in the piston. Flow of water through the aperture 21 of the housing 20 is controlled and regulated by means of a valve device comprising an externally flanged cylindrical metal plug 22 whose end is beveled or tapered on three sides as shown in Figs. 1, 2 and 3. The triangular lower end of this plug 22 has a reduced cylindrical stem portion 23 extending and projecting down through a guide hub or boss 24 on a bridge 25 across the lower end of the housing 20. When the piston 5 moves down under the water supply pressure, the valve plug 22 travels with it a short distance, until the stem 23 engages the lower end or wall of the chamber 6 and lifts the plug flange and the subjacent tapering portion off and through the seat 21, thus opening a passage through the piston whose effective area corresponds to the extent of piston movement. When the hot water faucet has been closed and the water pressure has become equalized above and below the piston 5, the spring 11 will return the piston, and the valve plug 22 will be positively returned to its seat 21 by engagement of an upward projecting hub extension 26 with the upper end of the chamber 6. There is a flexible check valve 30 at the outlet end of the housing 20; this check valve freely permits flow of water from inlet to outlet side of the piston 5, but prevents return flow. As shown, this valve is mounted on the guide hub 24, and comprises centrally apertured superposed discs 31 and 32 of thin, resilient sheet metal, with radial slots for flexibility staggered to prevent or minimize leakage. These discs 31 and 32 are secured and held in place by nuts 33, 33 screwed on the hub 24. Means may be provided for suitably limiting movement of the piston 5 each way, such as one or more stop projections 34, one on each side of the rod 14 being preferred, on the outlet side of the piston for engaging the corresponding chamber end, and a stop projection 35 on the inlet side of the piston for engaging a corresponding stop boss 36 on the upper chamber end. As shown, the chamber 6 has an opening at its upper end coextensive with its bore, to permit cleaning, or removal of parts on occasion. Accordingly, a removable cover 37 is provided, (shown as secured on the end of the chamber and rendered watertight by an interposed annular gasket 38), for normally closing this opening.

It will be seen, therefore, that there are no springs whatever in the chamber 6, so that the device is not liable to be rendered inoperative or ineffective by the rapid destructive action of some kinds of water on springs—even springs of the best phosphor bronze. Moreover, the external spring 11 that is depended on to close the valve 22 is the same that returns the piston 5, and powerful enough to reduce interference of sediment with proper seating of the valve 22 to a minimum. When the chamber opening is opened up by removal of the closure 37, the valve device 22 is at once freely removable, for cleaning or replacement, separate and apart from the piston 5,—without any necessity of removing the piston. This means great economy of time and labor as compared with any construction requiring removal of the piston for removal of the valve; because removal of the piston entails the time consuming and tedious operation of repacking its rod 14,—something in itself not very often necessary, whereas the valve must be removed and cleaned quite frequently.

The valve 22, it will be seen, "floats" in the piston aperture 21. It has a limited freedom of movement relatively to the piston 5, while at the same time kept from displacement from proper working relation to the piston. Also, the opening 16 of the gas valve 10 varies according to the concurrent opening of the valve 22 at 21 and the amount of water flowing through the heater.

What I claim is:

1. A water valve for an instantaneous water heater, comprising a chamber with water inlet and outlet; an apertured water piston in said chamber between said inlet and outlet, with actuating means for the gas supply control of the heater; movable valve means for the piston aperture opened by inlet pressure actuated movement of the piston and positively moved to close by return movement thereof; and means outside said chamber for returning the piston when the inlet pressure thereon falls off.

2. A water valve for an instantaneous water heater, comprising a chamber with water inlet and outlet; an apertured water piston in said chamber between said inlet and outlet, with actuating means for the gas supply control of the heater; and a movable valve device for the piston aperture opened and closed by engagement with opposite ends of said chamber on inlet pressure actuated and return movement of the piston.

3. A water valve for an instantaneous water heater, comprising a chamber with water inlet and outlet; an apertured water piston in said chamber between said inlet and outlet, with actuating means for the gas supply control of the heater; and a freely movable and removable regulator plug in the piston aperture projecting toward opposite ends of the chamber for opening and closing actuation thereby on inlet pressure actuated and return movement of the piston.

4. A water valve for an instantaneous water heater, comprising a chamber with water inlet and outlet, and an opening with removable closure at one end; an apertured water piston in said chamber between said inlet and outlet, with actuating means for the gas supply control of the heater; and a movable regulator plug in the piston aperture moved to open and to close by inlet pressure actuated and return movement of the piston, and at once freely removable, separate and apart from the piston, through the aforesaid casing opening when open.

5. A water valve for an instantaneous water heater, comprising a chamber with water inlet and outlet; an apertured water piston in said chamber between said inlet and outlet, provided, at one side, with guide means adjacent said aperture and with actuating means for the gas supply control of the heater; and a movable valve device in said piston aperture having a stem guided in said guide means and projecting therethrough for actuation by one chamber end on movement of said piston one way, and having an extension to the other side of said piston for actuation by the other chamber end on movement of said piston the other way.

6. A water valve for an instantaneous water heater, comprising a chamber with water inlet and outlet; an apertured water piston in said chamber between said inlet and outlet, provided, at one side, with guide means adjacent said aperture and with actuating means for the gas supply control of the heater; and a movable valve device in said piston aperture having a stem guided in said guide means and projecting therethrough for actuation by one chamber end on movement of said piston one way and having an extension to the other side of said piston for actuation by the other chamber end on movement of said piston the other way; and a check valve at the outlet side of said piston aperture mounted on said guide means.

In testimony whereof, I have hereunto signed my name.

JOHN H. KOLTS.